United States Patent
Wambaugh et al.

(10) Patent No.: US 8,959,861 B1
(45) Date of Patent: Feb. 24, 2015

(54) SEAM FREE WATER IMPERMEABLE CONSTRUCTION MATERIALS PROVIDING NON-TOXIC INSTALLATIONS

(71) Applicant: Jet Products, LLC, Houston, TX (US)

(72) Inventors: James Allen Wambaugh, Houston, TX (US); Brett Rochner, Houston, TX (US)

(73) Assignee: Jet Products, LLC, Houston, TX (US)

( * ) Notice: Subject to any disclaimer, the term of this patent is extended or adjusted under 35 U.S.C. 154(b) by 0 days.

(21) Appl. No.: 14/475,396

(22) Filed: Sep. 2, 2014

(51) Int. Cl.
*E04D 3/35* (2006.01)
*E04D 11/02* (2006.01)
*E04B 1/66* (2006.01)
*E04B 1/64* (2006.01)

(52) U.S. Cl.
CPC .. *E04B 1/665* (2013.01); *E04B 1/64* (2013.01)
USPC .............. 52/409; 52/410; 52/411; 52/417; 52/460; 52/461; 52/462; 52/463; 52/540; 52/543; 52/741.1; 52/746.11; 428/189

(58) Field of Classification Search
CPC ............. E04C 2/526; E04D 1/28; E04D 1/36; E04B 1/68
USPC ........... 52/408–411, 417, 460, 461, 540, 543, 52/741.4, 746.1, 746.11, 462, 463; 428/58, 61, 77, 189
See application file for complete search history.

(56) References Cited

U.S. PATENT DOCUMENTS

| | | | | |
|---|---|---|---|---|
| 985,140 | A * | 2/1911 | Button | 52/540 |
| 3,111,787 | A * | 11/1963 | Chamberlain | 52/309.9 |
| 3,468,086 | A * | 9/1969 | Warner | 52/173.1 |
| 3,488,248 | A * | 1/1970 | Long | 428/43 |
| 3,708,935 | A * | 1/1973 | Kossuth et al. | 52/416 |
| 4,453,358 | A * | 6/1984 | Gruber et al. | 52/309.8 |
| 4,535,581 | A * | 8/1985 | Fujiki et al. | 52/746.11 |
| 4,586,308 | A * | 5/1986 | Jennings | 52/393 |
| 4,936,070 | A * | 6/1990 | Michaud | 52/40 |
| 5,085,022 | A * | 2/1992 | Paliwoda | 52/309.8 |
| 5,236,757 | A * | 8/1993 | Probst et al. | 428/70 |
| 5,311,717 | A * | 5/1994 | Yount et al. | 52/417 |
| 5,487,250 | A * | 1/1996 | Yount et al. | 52/417 |
| 6,055,786 | A * | 5/2000 | Hubbard et al. | 52/409 |
| 7,178,306 | B2 * | 2/2007 | Fritz | 52/746.11 |
| 7,255,907 | B2 | 8/2007 | Feigin et al. | |
| 7,607,271 | B2 * | 10/2009 | Griffin et al. | 52/535 |
| 7,622,187 | B2 * | 11/2009 | Clarke et al. | 428/343 |
| 7,867,597 | B2 | 1/2011 | Feigin et al. | |
| 7,998,547 | B2 | 8/2011 | Feigin et al. | |
| 8,701,367 | B2 * | 4/2014 | Georgeau et al. | 52/408 |
| 2004/0226247 | A1 * | 11/2004 | Byrd | 52/518 |
| 2005/0144850 | A1 * | 7/2005 | Hageman | 52/3 |

* cited by examiner

*Primary Examiner* — Robert Canfield

(74) *Attorney, Agent, or Firm* — Buskop Law Group, PC; Wendy Buskop

(57) ABSTRACT

A water impermeable structure comprising a plurality of construction boards fastened to a structure or a building. Each construction board comprises a curable substrate and a water impermeable seamless resilient membrane adhered to the curable substrate. The water impermeable seamless resilient membrane comprises one or more flaps that extend beyond the curable substrate. The flaps affix to the adjoining construction board creating a water impermeable structure and a water impermeable structure with at least one water impermeable area.

13 Claims, 8 Drawing Sheets

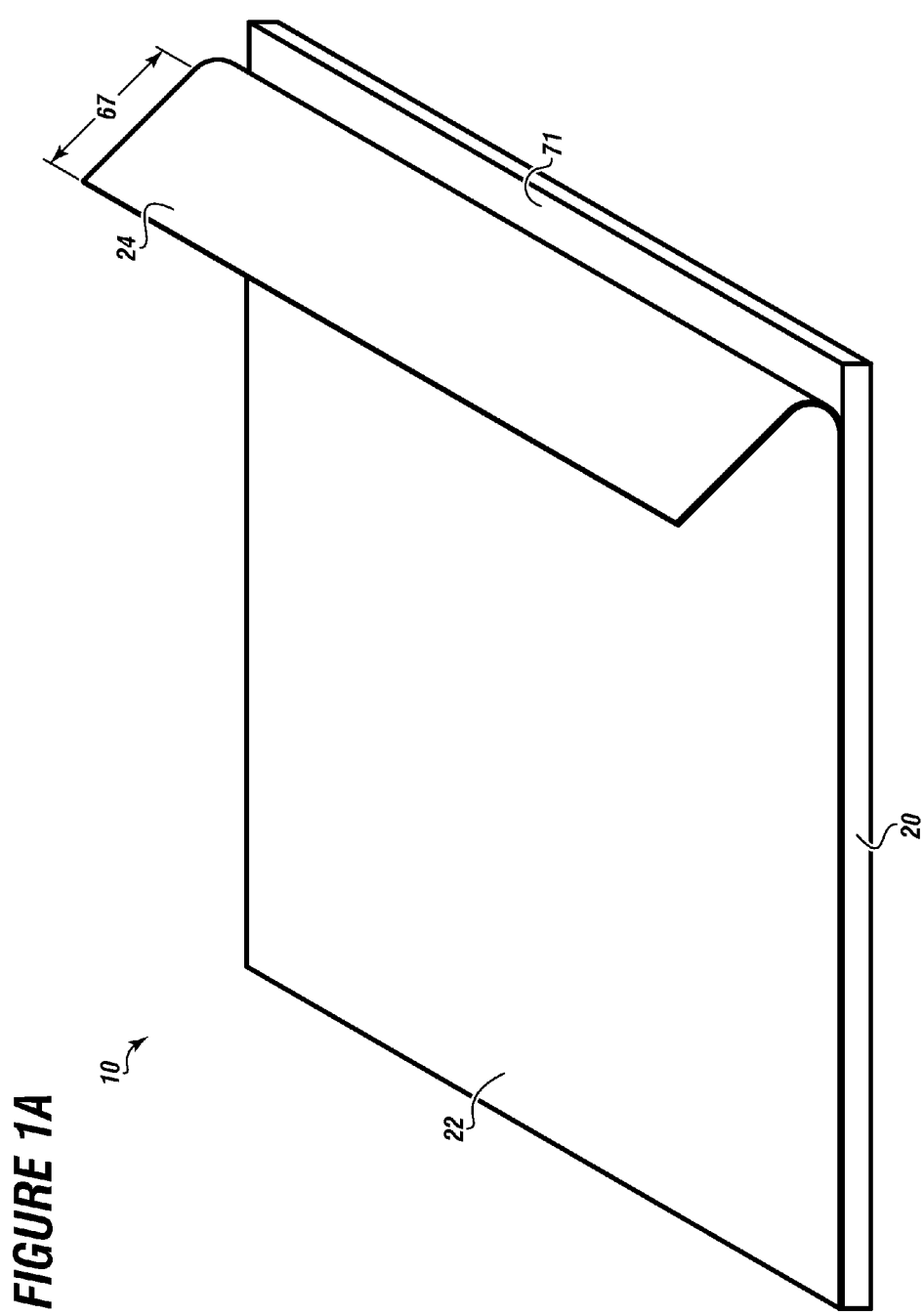

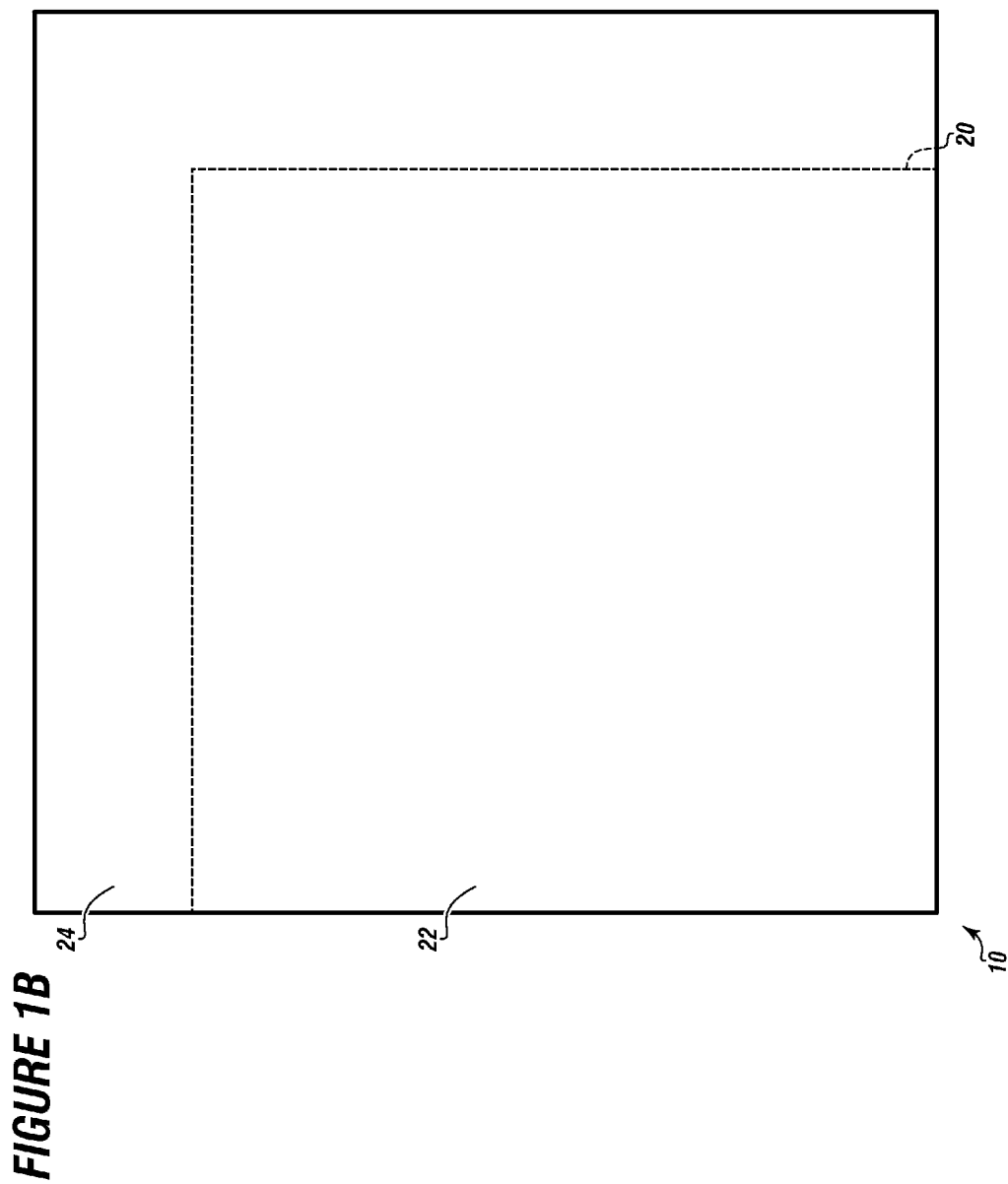

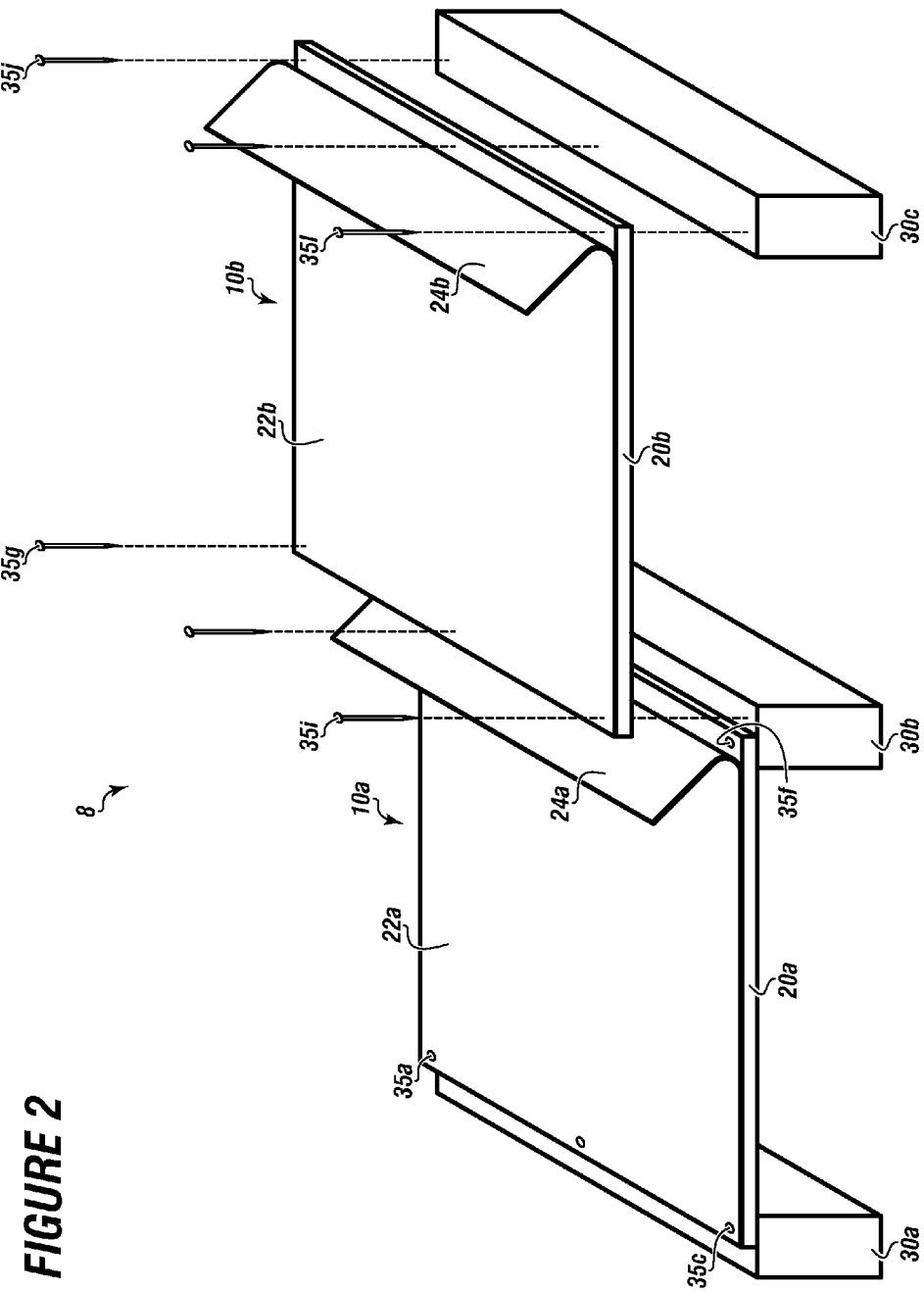

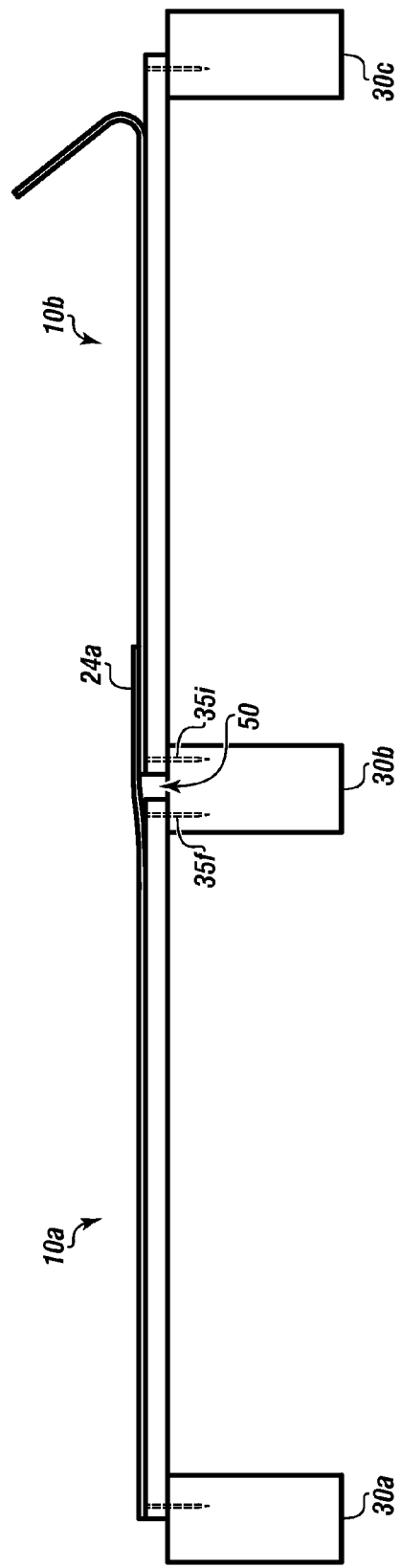

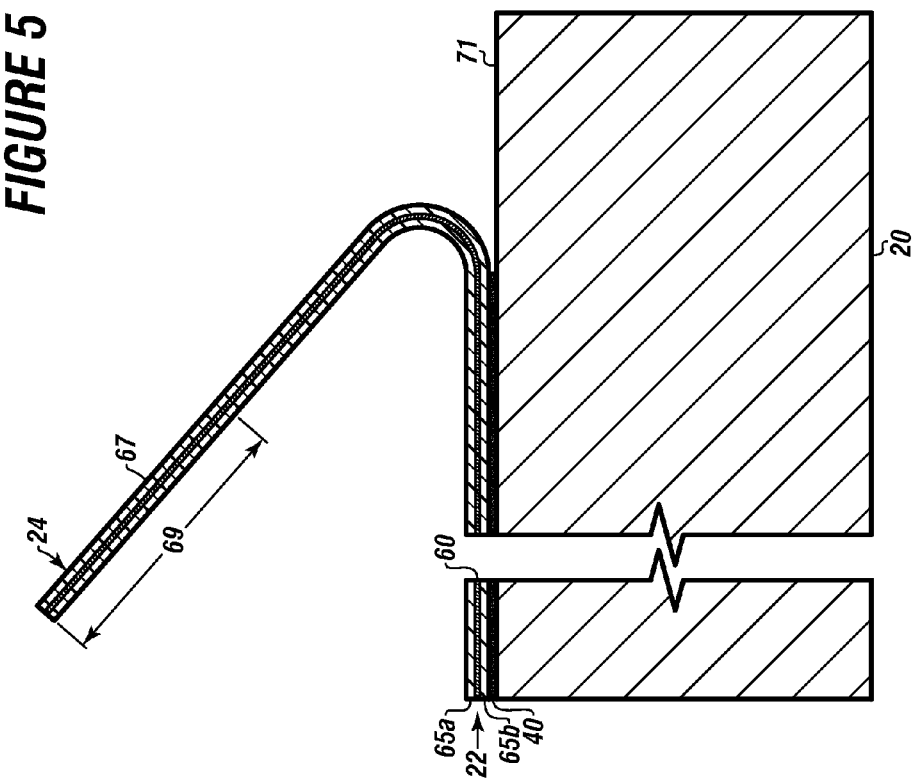

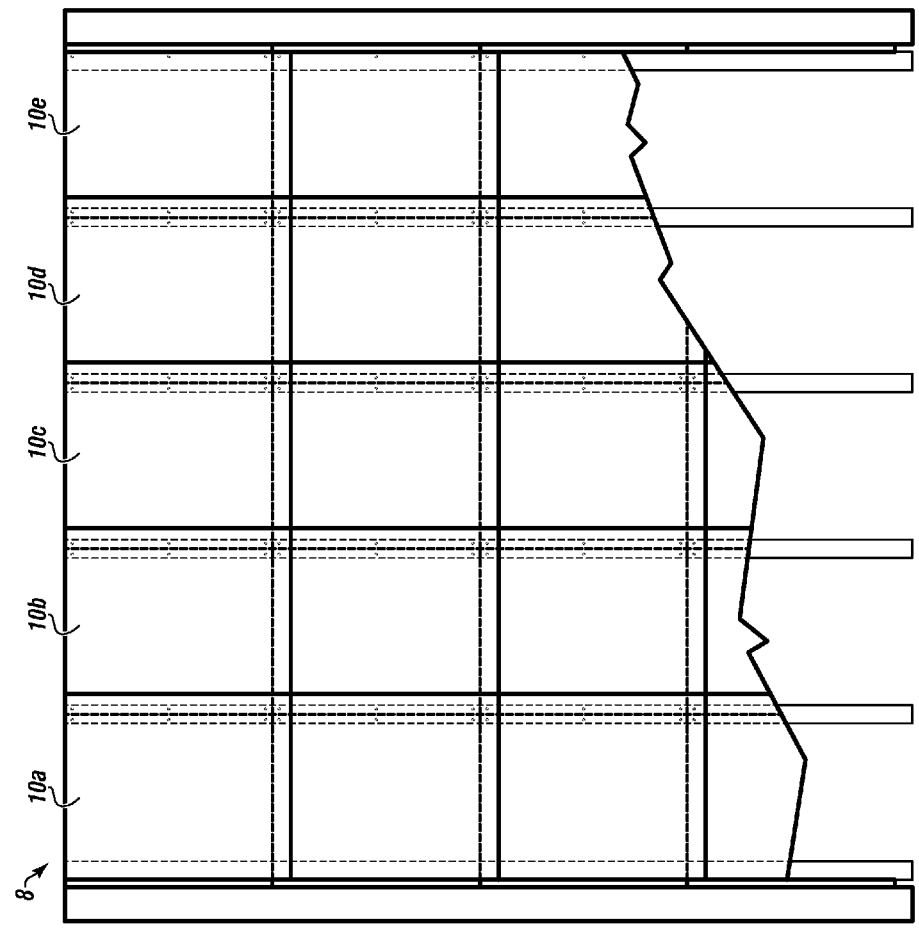

SEAM FREE WATER IMPERMEABLE CONSTRUCTION MATERIALS PROVIDING NON-TOXIC INSTALLATIONS

FIELD

The present embodiments generally relate to a method and system of creating a water impermeable structure using multiple construction boards, wherein the fasteners and all gaps are sealed, creating a seam free water impermeable surface.

BACKGROUND

Homes and other types of structures are fabricated from a variety of materials. Typical materials include, for example, gypsum wallboard and silicate-based products. Conventional gypsum wallboard, while generally satisfactory for its intended use, unfortunately can be easily permanently damaged from water, fire, or blunt force (e.g., a chair knocking into the wall). Also, it has been reported that products that contain silicate in some situations may be harmful to humans. Accordingly, special precautions must be taken to minimize the harmful effects to construction workers that work with silicate-based products.

Further, some structures need to be water impermeable, such as shower stalls. Typically, shower walls are constructed by fastening moisture resistant drywall on to the studs, tile is set, and the waterproofing caulk is applied. Due to caulk and moisture resistant drywall being very porous, water can easily get inside the wall if a water-proof vapor barrier system is not installed. The fastening points are also a place where water can easily get inside the wall. If water or steam gets inside the wall, it can cause a number of problems such as mold, mildew, backer/stud damage and water leaks.

Due to these issues many showers are now installed with a membrane that is mechanically or chemically bonded to the backer board. Backer board manufacturers are now manufacturing backer boards with water-proof and vapor-proof properties. When installing a water-proof vapor barrier bonded backer board the installer must use seam tape to cover joints and ensure that any water that gets to the barrier makes its way into the shower pan. The majority of the failures from these water-proof vapor barrier systems happen at the board to board joint or fastener or at the board to shower pan joint or fastener.

A need exists for a water impermeable system to be used in places such as behind shower walls, countertops, and floors which is easy to install and versatile for many shapes of structure.

The present embodiments meet these needs by, among other things, preventing water from rotting the structure as it forms a seam free, sealed system that cannot be deteriorated by water—it will not de-laminate, peel, rot, or swell.

BRIEF DESCRIPTION OF THE DRAWINGS

The detailed description will be better understood in conjunction with the accompanying drawings as follows:

FIG. 1A depicts an isometric view of a single construction board with a flap extending from one side.

FIG. 1B depicts a top view of a single construction board with a flap extending from multiple sides.

FIG. 2 depicts two construction boards being fastened to a structure.

FIG. 4B depicts a side view of two construction boards fastened to a structure forming a resistant seal over a gap.

FIG. 5 depicts a detail side view of the curable substrate, water impermeable seamless resilient membrane with flap.

FIG. 6 depicts a plurality of construction boards affixed together forming a water impermeable structure which in embodiments is a wall of a facility.

Figure 3:
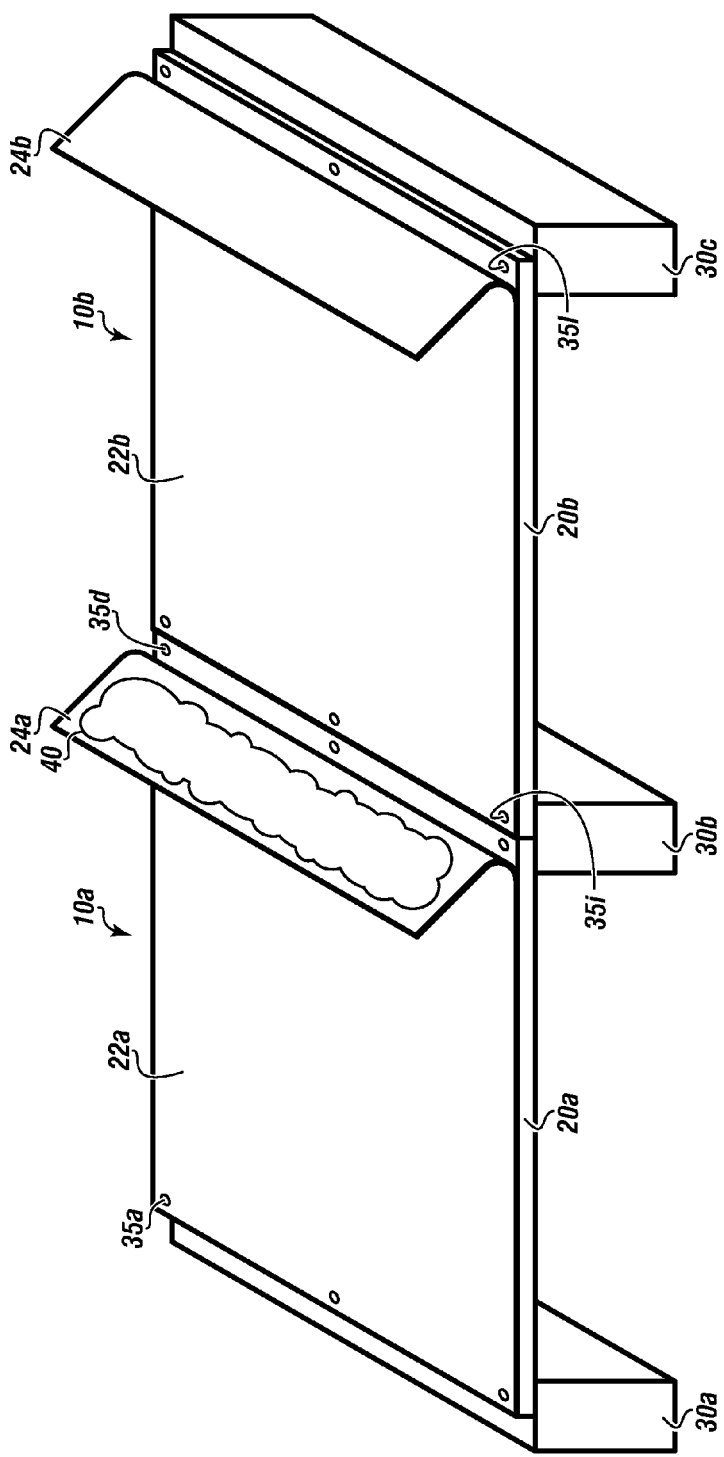
FIG. 3 depicts an isometric view of two construction boards fastened to a structure with flaps extending and an adhesive.

The present embodiments are detailed below with reference to the listed Figures.

DETAILED DESCRIPTION OF THE EMBODIMENTS

Before explaining the present invention in detail, it is to be understood that the invention is not limited to the particular embodiments and that it can be practiced or carried out in various ways.

The present embodiments relate to water impermeable structures covered with a plurality of construction boards fastened to the structure.

In embodiments, the formed water impermeable structure is a facility, home, office, warehouse, shed, dock or another load supporting structure.

Each construction board has a curable substrate. In embodiments, the curable substrate can be molded from a curable paste.

The curable substrate can be made from a spreadable paste having magnesium oxide; magnesium chloride and perlite.

In embodiments, the spreadable paste additionally can comprise at least one of: 0.1 weight percent to 30 weight percent styrene based foam beads based on the total curable substrate; 0.1 weight percent to 15 weight percent fiberglass beads; 0.1 weight percent to 15 weight percent carbon fiber strands; 0.1 weight percent to 5 weight percent glue; 0.1 weight percent to 5 weight percent phosphorous acid; 0.1 weight percent to 12 weight percent phosphate salts. 0.1 weight percent to 5 weight percent phosphoric acid; 0.1 weight percent to 15 weight percent biomass; and 0.1 weight percent to 10 weight percent calcium carbonate.

In embodiments, the biomass can be wood flour, straw, ground pecan shells, and ground up bagasse.

In embodiments the phosphate salts can be salts of potassium, magnesium, aluminum, calcium, sodium.

Each construction board can also be a water impermeable seamless resilient membrane adhered to the curable substrate. The water impermeable seamless resilient membrane can have one or more flaps that extend beyond the curable substrate. Each flap can affix to an adjoining construction board.

In embodiments, the water impermeable seamless resilient membrane can be a non-porous film with a thickness from 10 microns to 200 microns simultaneously with an ability to stretch in a linear direction and along a bias to up to 10 percent larger than an original film shape.

In embodiments, the curable substrate can have fiberglass sheets positioned on surfaces of the curable substrate, or fiberglass fibers mixed into the curable paste prior to curing.

The term "construction material" as used herein refers to components used to create a water impermeable structure, such as a facility, including but not limited to multifamily, residential, commercial, industrial and medical facilities and even temporary shelters for use in disasters, such as hurricanes.

The term "curable substrate" as used herein refers to a substrate made from a paste that is molded into the base material over which a water impermeable seamless resilient member is adhered. The curable substrate in embodiments is constructed from paste like materials, which are known in the art and industry.

The term "water impermeable structure" as used herein refers to all or a part of a water-impermeable structure ranging from small areas of floors and roofs to more complete structures, such as showers, closets, rooms, buildings, or facilities.

The term "moisture resistant adhesives" as used herein refers to an adhesive with an ability to resist deterioration due to water, either liquid or vapor.

The term "non-removable" as used herein refers to an adhesive which when applied to the water impermeable seamless resilient membrane and then the membrane cannot be peeled or separated from the curable substrate.

The present embodiments relate to a multi-functional water impermeable system with improved sealing properties.

The present embodiments provide a benefit in that the water resistant seam constructions prevent mold and mildew. The water resistant seam constructions also make the system optimal for use as an underlay for ceramic tiles and natural stone.

The present embodiments are not only a water impermeable system, but also multi-functional, as the system is resistant to chemical solutions, salts, alkalis, oils, and organic solvents.

The present embodiments eliminate the risk of vapor and moisture penetration outside the designed enclosure.

In the broadest embodiment, the water impermeable structure has one or more construction boards fastened to the structure.

Each construction board has a curable substrate made from a paste, and after curing, a water impermeable seamless resilient membrane is adhered to the curable substrate.

The water impermeable seamless resilient membrane has one or more flaps that extend beyond the curable substrate and affix to the adjoining construction boards creating a seam free surface. In embodiments, a single board may have multiple flaps extending from the portion of the membrane covering the curable substrate.

The present embodiments can also include applying a water based quick drying thin bed mortar layer over the water impermeable seamless resilient membrane and/or installing a plurality of ceramic tiles to the mortar.

In other embodiments, instead of tile, applying a roofing material, over the membrane can be used.

In other embodiments, applying styrene butadiene rubber over the membrane for a fully insulated roof can be used.

In other embodiments, applying stone, or thin veneer brick to the membrane for and additional decorative and functional outdoor use can be used.

In embodiments, applying hardwoods over the membrane allow for individual units to be water resistant between units, in multifamily units, preventing water damage to travel between units when a tub overflows. This invention allows an entire bathroom to become a watertight container.

The present embodiments specifically exclude the addition of volatile organic compounds to the construction material.

The present embodiments are completely non-toxic so builders do not have to worry about inhaling toxic dust and is also a benefit for homeowners with allergies and chemical sensitivities.

The present embodiments provide a benefit in that in addition to creating the water impermeable facility or structure, the water impermeable facility is also fireproof when backer boards are used as the curable substrate, preventing burns to office workers in a building.

Embodiments of the invention are 100 percent free of crystalline silica which is known to cause lung disease.

Further, the present embodiments prevent degradation of studs by water damage and mold, which could cause collapse a building and death of people inside the building.

Turning now to the Figures, FIG. 1A depicts an isometric view of a single construction board 10 with a flap 24 extending from one side. The construction board 10 can have a curable substrate 20 that is covered by a water impermeable seamless resilient membrane 22. The water impermeable seamless resilient membrane 22 can have one or more flaps 24 that extend beyond the curable substrate 20.

An adhesive free portion of the flap 67 is shown as well as the adhesive free portion of the curable substrate 71.

FIG. 1B depicts a top view of a single construction board 10 with a flap 24 extending from multiple sides of the curable substrate 20.

In embodiments, the flap can extend from one or more sides. In other embodiments, there can be multiple overlapping flaps.

In embodiments, the flap can be an integral one piece flap.

While the Figures depict a rectangular shape for the construction board 10, the construction board 10 can be of any shape.

Optimally, the construction boards are of shapes that fit efficiently together to cover the most space of the structure.

An embodiment of the system can include construction boards 10 composed of a curable substrate 20 of construction materials known in the industry.

As non-limiting examples, the curable substrate 20 can be made from a molded composition formed from a paste containing magnesium oxide, magnesium chloride, and perlite.

Further, the curable substrate 20 can be a gypsum curable substrate, a wood curable substrate, a cement curable substrate, coated metals, uncoated steel, plastic composites, and combinations thereof.

In embodiments, the system can include curable substrates made of the same material, but curable substrates of different materials can be used without affecting the benefits of the water resistant system.

In embodiments, the thickness of the curable substrate 20 can be from ¼ of an inch to 2 inches.

The curable substrate can be thicker (or even thinner) when the construction of the water impermeable structure or facility requires a different size.

The water impermeable seamless resilient membrane 22 is shown. The water impermeable seamless resilient membrane 22 can be a barrier bonded mechanically or chemically to the curable substrate 20.

The water impermeable seamless resilient membrane 22 can be water impermeable and/or resistant to chemical solutions, salts, alkalis, oils, and organic solvents.

In embodiments, the water impermeable seamless resilient membrane 22 can be composed of a laminate of polyethylene between two layers of fleece-like polypropylene. The fleece-like polypropylene can comprise amorphous monomers, copolymers and terpolymers of propylene that provide adhesion and protection.

In embodiments, the water impermeable seamless resilient membrane can be a laminate of polyethylene between two layers of fleece-like polypropylene and the fleece-like polypropylene is adapted to support adhesion to the fibers of the fleece-like polypropylene.

In embodiments, the fleece-like polypropylene can contain a plurality of loops of polypropylene fibers adapted to mechanically hold additional ingredients between the loops, and wherein a density of loops is at least 100 loops per inch.

In still other embodiments, the fleece-like polypropylene can comprise amorphous propylene monomers, propylene copolymers and propylene/ethylene terpolymers.

FIG. 2 depicts a water impermeable structure 8 comprising two construction boards 10a and 10b being fastened to a structure 30a-30c, such as a building. The structure is shown as three studs.

Each construction board 10a and 10b can be affixed to the structure using fasteners 35a-35l.

The fasteners 35a-35c and 35g-35i penetrate through a water impermeable seamless resilient membrane 22a and 22b respectively to curable substrates 20a and 20b respectively.

Fasteners 35d-35f and 35j-35l penetrate through a curable substrate to the structure, but do not go through a water impermeable seamless resilient membrane.

Each flap 24a and 24b can extend from a side of the construction board. Each construction board can have one or more flaps.

FIG. 3 depicts an isometric view of two construction boards 10a and 10b fastened to a structure 30a-30c using the fasteners 35a-35l.

Flap 24a is shown being prepared to be laid over fasteners 35d-35i, thereby creating a resistant seal. Flap 24a is specifically designed to cover a fastener of the curable substrate to which the flap is attached and a fastener on the curable substrate of an adjoining construction board. Additionally the flap can cover a gap between the boards. The flap must cover the adjacent nails or screws by at least 2 inches to ensure a water-proof bond.

An adhesive 40 can be included on the flap 24a for use during construction. The flaps are affixed to the adjoining construction boards using the adhesive 40. In an embodiment, the adhesive 40 can have a removable film over the adhesive that can be removed prior to sealing.

Each construction board can include a curable substrate 20a and 20b, a water impermeable seamless resilient membrane 22a and 22b, a flap 24a and 24b and a plurality of fasteners 35a-35l.

Figure 4A:
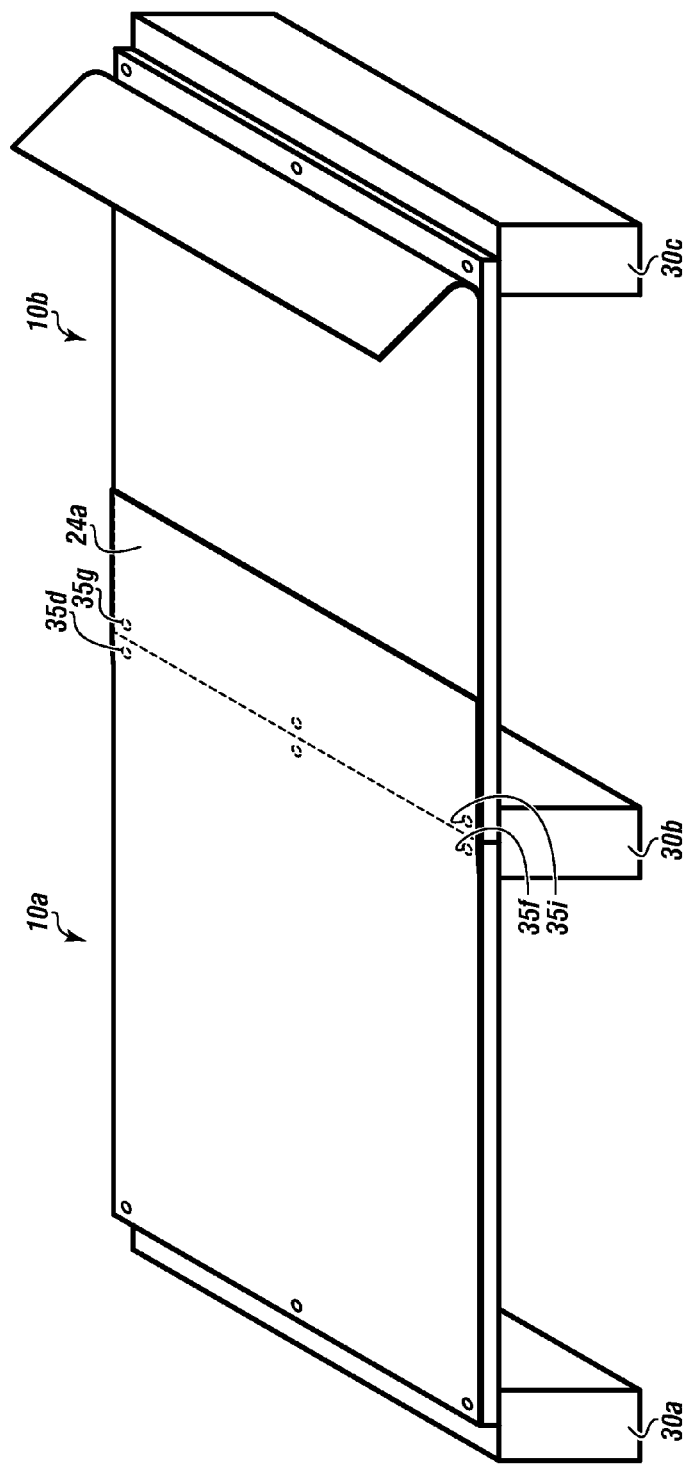
FIG. 4A depicts an isometric view of two construction boards fastened to a structure forming a resistant seal.

FIG. 4A depicts an isometric view of two construction boards 10a and 10b fastened to a structure 30a-30c with the resistant seal in place.

A flap 24a is shown sealed over fasteners 35d-35i as well as over the gap created between the two adjoining construction boards. As stated earlier, the preference is for the construction boards to have a minimal gap, but the embodied system can handle gaps up to 2 inches without compromising integrity.

Each flap covers a plurality of fasteners, at least one fastener on a first construction board and at least one fastener on an adjoining construction board, and a gap between adjoining construction boards.

FIG. 4B depicts a side view of an embodiment wherein a gap 50 is shown sealed by a flap 24a between two construction boards 10a and 10b. The flap 24a is shown covering fasteners 35f and 35i, with each fastener on an adjoining construction board.

The construction boards are shown fastened to the structure 30a-30c with fasteners.

The adhesive used to keep the flaps affixed must be moisture resistant. Any moisture resistant adhesive known in the art can be used. One example is a moisture resistant adhesive known as hot melt glue, another example is an epoxy-based adhesive, a third example is a heat free-curable adhesive, and a fourth example is a water based adhesive.

FIG. 5 depicts a detail side view of the curable substrate 20, as well as the water impermeable seamless resilient membrane 22 and flap 24. The water impermeable seamless resilient membrane 22 can be a laminate of polyethylene 60 between two layers of fleece-like polypropylene 65a and 65b.

In this Figure, the adhesive free portion of the flap 67 is shown as well as the adhesive free portion of the curable substrate 71. Additionally, an overlap portion 69 adapted to overlap an adjacent construction board by at least 2 inches is shown. Both the adhesive free portions and the overlap portion are adapted to enable fasteners to be installed in the curable substrate without penetrating the water impermeable seamless resilient membrane.

The curable substrate can have an adhesive 40 disposed over a portion of the curable substrate.

FIG. 6 depicts a plurality of construction boards 10a-10e affixed together forming a water impermeable structure 8. In embodiments, the water impermeable structure can be a facility or a building. In embodiments, the water impermeable structure can be a shower and the construction boards can be affixed on the walls and ceiling of the shower, with just a portion of the walls shown in this Figure.

As an example, a construction board's water impermeable seamless resilient membrane can have a 3 inch flap on two edges of the board, such as the north side and the east side from a top view.

At these edges, the water impermeable seamless resilient membrane is not adhered 1.5 inches from the edge of the board.

To install a seamless joint, the flap can be pulled back and a nail or screw can be driven into the 1.5 inch adhesive free area of the curable substrate. After the curable substrate is secured to the studs, the flap is then laid down over the nails or screws of both the curable substrate and the adjacent curable substrate additionally covering any gap between the curable substrate.

These steps can be repeated until all the required surface areas are covered and sealed into one seamless system.

Another embodiment is a water impermeable facility with at least one water impermeable area. The water impermeable area includes two or more connected water impermeable construction boards. Each water impermeable construction board is seam free and tape free.

Each water impermeable construction board has a curable substrate and a water impermeable seamless resilient membrane preventing 100 percent moisture penetration to the curable substrate when adhered to the curable substrate without fasteners forming a bond adapted to support a load of at least 2.5 pounds per square foot.

When finished, with the construction boards attached, it is contemplated that the water impermeable structure supports a load of at least 2.5 pounds per square foot.

The water impermeable seamless resilient membrane provides, simultaneously, impact resistant protection, adhesion to additional material, and 100 percent water resistance.

In this embodiment, each water impermeable seamless resilient membrane has an adhered central portion and one or more integral flaps extending away from the adhered central portion.

Each flap has an adhesive free portion adapted to fold away from the curable substrate by at least 1 inch, and an overlap portion adapted to overlap an adjacent construction board by at least 2 inches.

Both the adhesive free portion and the overlap portion are adapted to enable fasteners to be installed in the curable substrate without penetrating the water impermeable seamless resilient membrane.

The formed water impermeable facility with at least one water impermeable area can also be further resistant to chemical solutions, salts, alkalis, oils, or organic solvents.

In another embodiment, the water impermeable structure with at least one water impermeable area has a plurality of connected water impermeable construction boards.

Each water impermeable construction board is seam free and tape free, and each water impermeable construction board has a curable substrate with at least one edge and an adhesive free portion.

Each board has a water impermeable seamless resilient membrane preventing 100 percent moisture penetration to the structure when adhered without fasteners to the curable substrate forming a bond adapted to support a load of at least 2.5 pounds per square foot.

The water impermeable seamless resilient membrane provides, simultaneously, impact resistant protection, and adhesion to additional material, and water resistance.

In this embodiment, the water impermeable seamless resilient membrane has a adhered central portion and at least one flap integrally connected to the central portion extending away from the at least one edge.

In this embodiment, each flap has an adhesive free portion adapted to fold away from the curable substrate by at least 1 inch; and an overlap portion adapted to overlap an adjacent construction board by at least 2 inches.

Both the adhesive free portion and the overlap portion are adapted to enable fasteners to be installed in the curable substrate without penetrating the water impermeable seamless resilient membrane.

Certain terms are used throughout the description and claims to refer to particular components. As one skilled in the art will appreciate, companies may refer to a component by different names. This document does not intend to distinguish between components that differ in name but not function. Further, in the specification and in the claims, the terms "including" and "comprising" are used in an open-ended fashion, and thus should be interpreted to mean "including, but not limited to . . ." All numerical values in this disclosures are exact or approximate. Accordingly, various embodiments of the invention may deviate from the exact numbers disclosed herein.

While these embodiments have been described with emphasis on the embodiments, it should be understood that within the scope of the appended claims, the embodiments might be practiced other than as specifically described herein.

What is claimed is:

1. A water impermeable structure, wherein the water impermeable structure comprises: a plurality of construction boards fastened to a building, wherein each construction board comprises:
    a curable substrate formed from a spreadable paste; and
    a water impermeable seamless resilient membrane adhered to the curable substrate, wherein the water impermeable seamless resilient membrane comprises one or more flaps that extend beyond the curable substrate, and wherein each flap affixes to an adjoining construction board; and
wherein the curable substrate is made from the spreadable paste comprising: magnesium oxide, magnesium chloride, and perlite, wherein the spreadable paste additionally comprising at least one of: 0.1 weight percent to 30 weight percent styrene based foam beads based on the total curable substrate; 0.1 weight percent to 15 weight percent fiberglass beads; 0.1 weight percent to 15 weight percent carbon fiber strands; 0.1 weight percent to 5 weight percent glue; 0.1 weight percent to 5 weight percent phosphorous acid; 0.1 weight percent to 12 weight percent phosphate salts; 0.1 weight percent to 5 weight percent phosphoric acid; 0.1 weight percent to 15 weight percent biomass; and 0.1 weight percent to 10 weight percent calcium carbonate.

2. The water impermeable structure of claim 1, wherein the water impermeable seamless resilient membrane additionally resists at least one of: chemical solutions, salts, alkalis, oils, and organic solvents.

3. The water impermeable structure of claim 1, wherein each construction board is fastened to the building using a fastener through the curable substrate and under the water impermeable seamless resilient membrane, wherein each flap covers:
    a pair of fasteners, a first fastener on a first construction board and a second fastener on an adjoining construction board, and
    a gap between adjoining construction boards.

4. The water impermeable structure of claim 1, wherein the flaps are affixed to the adjoining construction boards using an adhesive.

5. The water impermeable structure of claim 4, wherein the adhesive is at least one of: a hot melt glue, a water based adhesive, an epoxy-based adhesive, and a heat free-curable adhesive.

6. The water impermeable structure of claim 1, wherein the water impermeable seamless resilient membrane is a non-porous film with a thickness from 10 microns to 200 microns with an ability to stretch in a linear direction and along a bias to up to 10 percent larger than an original film shape.

7. The water impermeable structure of claim 1, wherein the water impermeable seamless resilient membrane is a laminate of polyethylene between two layers of fleece-like polypropylene and the fleece-like polypropylene is adapted to support adhesion to the fibers of the fleece-like polypropylene.

8. The water impermeable structure of claim 7, wherein the fleece-like polypropylene comprises a plurality of loops of polypropylene fibers adapted to mechanically hold additional ingredients between the loops, and wherein a density of loops is at least 100 loops per inch.

9. The water impermeable structure of claim 7, wherein the fleece-like polypropylene comprises amorphous propylene monomers, propylene copolymers and propylene/ethylene terpolymers.

10. The water impermeable structure of claim 1, wherein the water impermeable structure supports a load of at least 2.5 pounds per square foot.

11. The water impermeable structure of claim 1, wherein the water impermeable structure is a home, an office, a warehouse, a shed, a dock or another load supporting structure.

12. A water impermeable structure with at least one water impermeable area, wherein the water impermeable area comprises a plurality of connected water impermeable construction boards, wherein each water impermeable construction board is seam free and tape free, and each water impermeable construction board comprises:
    a curable substrate formed from a spreadable paste with at least one edge and an adhesive free portion;
    a water impermeable seamless resilient membrane preventing 100 percent moisture penetration to the water impermeable structure when adhered without fasteners to the curable substrate forming a bond adapted to support a load of at least 2.5 pounds per square foot, wherein the water impermeable seamless resilient membrane provides, simultaneously, impact resistant protection, and adhesion to additional material, and water resistance; wherein the water impermeable seamless resilient membrane comprises an adhered central portion; and at least one flap integrally connected to a central portion extending away from the at least one edge, each flap comprising:
  an adhesive free portion adapted to fold away from the curable substrate by at least 1 inch; and
  an overlap portion adapted to overlap an adjacent construction board by at least 2 inches, wherein both the adhesive free portion and the overlap portion are adapted to enable fasteners to be installed in the curable substrate without penetrating the water impermeable seamless resilient membrane; and
wherein the curable substrate is made from the spreadable paste comprising: magnesium oxide, magnesium chloride, and perlite, wherein the spreadable paste additionally comprising at least one of: 0.1 weight percent to 30 weight percent styrene based foam beads based on the total curable substrate; 0.1 weight percent to 15 weight percent fiberglass beads; 0.1 weight percent to 15 weight percent carbon fiber strands; 0.1 weight percent to 5 weight percent glue; 0.1 weight percent to 5 weight percent phosphorous acid; 0.1 weight percent to 12 weight percent phosphate salts; 0.1 weight percent to 5 weight percent phosphoric acid; 0.1 weight percent to 15 weight percent biomass; and 0.1 weight percent to 10 weight percent calcium carbonate.

13. The water impermeable structure of claim 12, wherein the water impermeable seamless resilient membrane additionally resists at least one of: chemical solutions, salts, alkalis, oils, or organic solvents.

* * * * *